United States Patent Office 3,231,512
Patented Jan. 25, 1966

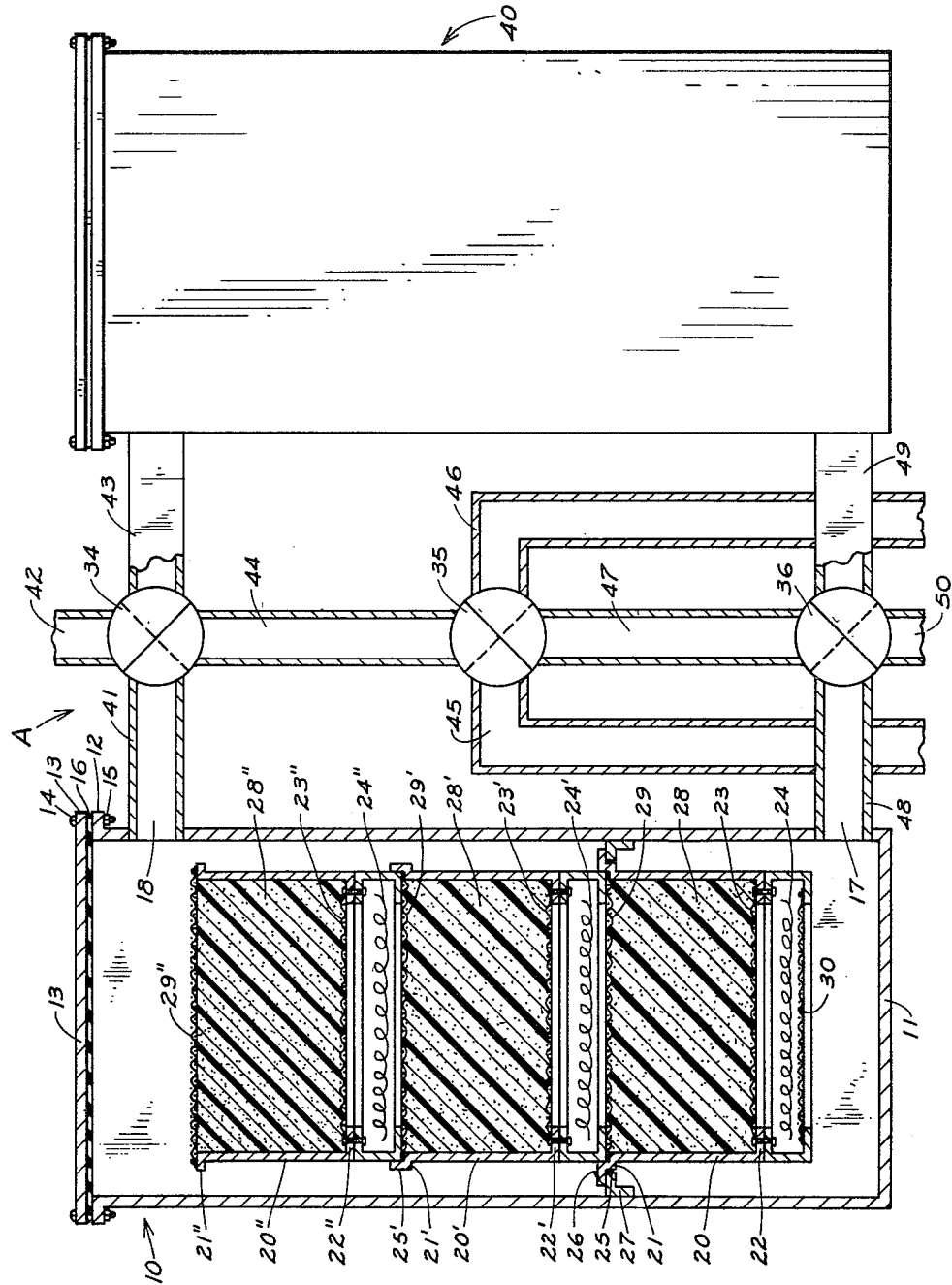

3,231,512
ADSORPTION DEVICE
Russell W. Harter, Springfield, Va., assignor to Atlantic Research Corporation, Fairfax County, Va., a corporation of Virginia
Filed July 10, 1963, Ser. No. 294,128
13 Claims. (Cl. 252—411)

This invention relates to adsorption devices and more particularly to adsorption devices having a plurality of heaters interspersed within a solid adsorbent material. It further relates to a method of reactivating the spent adsorbent material within such devices.

Generally, adsorption devices and methods of reactivating the adsorbent material within them are well known. These devices have long employed a wide variety of adsorbent materials to remove fluid adsorbates from a fluid mixture passing through them. When the adsorbent material is substantially saturated with the adsorbate, that is, when it can no longer adsorb efficiently, it must be reactivated before it can be used again. The reactivation cycle of spent or exhausted adsorbent material usually includes two steps. First the adsorbent material is heated to or above a temperature sufficient to release the adsorbate which is removed from the adsorption device by a purging fluid. Second, after the purging step is completed the heat source is turned off and the temperature of the adsorbent material is lowered by a cooling fluid to a level at which it will again adsorb efficiently. The period of time required to complete this reactivation cycle is one of the primary factors which determines the capacity of an adsorption device, that is, the amount of adsorbate which can be removed in a given length of time per unit of adsorbent material. Thus, if less time is used for reactivation, the proportion of adsorption time is increased and the capacity rating is accordingly increased.

Generally, the heat necessary to raise the temperature of an adsorbent material to the required level for reactivation has heretofore been supplied by a single heating unit placed contiguous to or within the adsorbent material itself. Many difficulties beset the reactivation of adsorption devices containing this structure. Since the adsorbent material is usually a good heat insulator, the single heating unit closely approximates an isolated heat source. Consequently, it is very difficult and takes considerable time to transfer sufficient heat throughout the adsorbent material, particularly the portions distal to the single heat source, so that the temperature of the entire adsorbent material attains a level sufficient to release the adsorbate. The time required for sufficient heat transfer can be reduced by increasing the heat supplied to the adsorbent. However, increasing the amount of heat can elevate the temperature of the adsorbent material adjacent to the heat source to a level which will damage it. Furthermore, much of the excess heat is lost, particularly in the case where the heating unit is located adjacent to rather than within the adsorbent material. In addition, the temperature of the adsorbent material is increased to such an extent that it takes an undesirably longer period to subsequently reduce its temperature to an efficient adsorption level, resulting in an actual increase in the overall reactivation time. The lengthened cooling period also seriously jeopardizes the performance of the adsorbent material due to the increased deposition of undesirable contaminants contained in the cooling fluid.

Accordingly, it is an object of this invention to provide a new and improved adsorption device having a decreased period of reactivation.

It is another object of this invention to provide an adsorption device having a structure which permits improved heating and faster reactivation of the adsorbent material.

Another object of this invention is to provide a new and improved method of reactivating adsorption devices.

A further object of this invention is to provide a method which decreases the period of reactivation of an adsorbent material.

Other objects, advantages and features of this invention will become apparent from the following detailed description and accompanying drawing which shows a semi-diagrammatic elevational view, in partial cross-section, of a preferred embodiment of the adsorption device of this invention.

In accordance with my invention, I have developed a device comprising an adsorption tower containing a plurality of heat sources alternately interspersed with a plurality of sections of adsorbent material and inlet and outlet ports which permit the passage of fluids through the adsorption tower. I have further discovered a method of reactivating the adsorbent material after it has been substantially exhausted. The plurality of heat sources are activated to introduce a plurality of staged heat fronts within the adsorbent material simultaneously with or prior to the passing of a purging fluid, e.g., air, through the adsorbent material. The heat sources are then shut off while the purging fluid continues to distribute the heat fronts throughout the adsorbent material. Subsequently, a cooling fluid is passed through the adsorbent material in the direction opposite to the flow of the purging fluid to complete the reactivation. For my purposes, the term staged refers to the regulation of the amount of heat supplied by each of the heat sources proportionate to the others. The amount of heat depends upon the position of the heat source in relation to the adsorbent material, that is, whether it is located adjacent to one section of adsorbent or between two sections, the kind of adsorbent material and adsorbate and the composition of the purging fluid.

I have found that the utilization of a plurality of the aforedescribed staged heat sources alternately interspersed with sections of adsorbent material effects a more direct, uniform heating of the adsorbent material in less time and with a considerably smaller total expenditure of power to generate the heat, than if a single heat source were employed. This results in a reduction in the heating and rate of flow of the purging fluid necessary to convey heat throughout the adsorbent material. In addition, the time required for complete heating, that is, the time required to elevate each portion of the adsorbent material to the temperature necessary for removal of the adsorbate, is also reduced. However, because of the uniform heating no excessively high temperatures are required and consequently the danger of heat damage to the adsorbent material is eliminated. Furthermore, the absence of such temperatures keeps the cooling period of the reactivation cycle at a minimum, thus reducing the degree of contamination from impurities present in the cooling fluid.

The figure of the drawing is a partial sectional view of the absorption device of this invention.

Adverting now in detail to the single drawing, there is shown two of the adsorption devices of this invention combined into a continuous flow adsorption system generally indicated by the reference character A. The description of the one device is equally applicable to the other, the details of which are not shown. My adsorption device includes a metal container 10 having a bottom 11, a top flange 12 and a removable top 13 secured to the top flange by bolts 14 and nuts 15 in such a manner as to form a fluid-tight juncture. A sealing gasket 16 can be inserted between the removable top and the top flange. Fluid inlet or outlet ports 17 and 18 are located near the top and bottom of the metal container. Located within the container are a plurality of receptacles 20, 20' and 20" having an upper flange 21, 21' and 21" and a lower inwardly extending flange 22, 22' and 22". Attached to the inwardly extending flanges by bolts are fine mesh wire screens 23, 23' and 23" and heating units 24, 24' and 24". The heating units can be any conventional type, e.g., electrical resistance heaters, well known in the art. The upper flange 21 of receptacle 20 and the upper flange 21' of receptacle 20' have upwardly extending portions 25 and 25', respectively, which form guides for receptacles 20' and 20", respectively, which rest upon the flanges. The upwardly extending portion 25 of receptacle 20 has a horizontal section 26 which rests upon a right angle bracket 27 secured to the sides of container 10, as by welding, to support all three receptacles within the container. The horizontal section and bracket prevent flow of fluid around rather than through the receptacles.

Each of the receptacles 20, 20' and 20" is filled with a dry, finely-divided, solid adsorbent material to form beds 28, 28' and 28" respectively. In order to retain the adsorbent material in the receptacles prior to and during their placement in the container, fine mesh wire screens 29, 29' and 29" are secured to the upper flanges 21, 21' and 21" of their respective receptacles by recessed bolts (not shown) threaded into apertures (not shown) in the flanges. Another fine mesh wire screen, whose function is explained hereinafter, is mounted in the bottom of heater 24.

A series of ducts 41–50 interconnect the fluid ports 17 and 18 of the container, the fluid ports (not shown) of the container 40 and the fluid control valves 34, 35, and 36. The ducts and valves form a network through which the flow of fluids, that is, the fluid mixture containing the adsorbate, the purging fluid, and the cooling fluid, can be controlled.

In the following explanation of the operation of my adsorption device in which two adsorption towers are employed to remove undesirable adsorbates from an enclosed area, it is to be understood that any number of towers, e.g., one or more can be used, depending upon the requirements of each individual use. The operation of the illustrated device is continuous, that is, while one adsorption tower is removing the undesirable adsorbate from a fluid mixture flowing through it, the other is being reactivated with a purging fluid. With the fluid control valves 34, 35, and 36 in the position indicated by the solid lines, a blower (not shown) or some similar device forces a fluid mixture containing the adsorbate through duct 42, valve 34, and duct 43 into container 40 where the adsorbate is removed. The remaining purified fluid mixture is returned through duct 49, valve 36 and duct 50 to the enclosed area.

The reactivation of the adsorbent material in container 10 is carried out concurrently with the adsorption process in container 40. With the fluid control valves 34, 35 and 36 still in the position indicated by the solid lines, a purging fluid, e.g., air, is drawn through duct 46, valve 35, duct 47, valve 36 and duct 48 into the container 10.

Prior to the time the purging fluid reaches the container the heating units are turned on imparting proportionate heat fronts within the adsorbent beds 28, 28' and 28". The heaters are so regulated that the lowest one imparts a relatively large heat front to the adjacent adsorbent bed and each successive heater imparts a proportionate heat front to the surrounding adsorbent. Generally, the required amount of heat supplied by the heating units 24' and 24" located between two adsorbent beds is considerably less than that required by the heating unit 24. The purging fluid enters the lower part of the container through port 17 and, as it is forced upward, it is heated by the heaters 24, 24' and 24" and the staged heat fronts established in the adjacent adsorbent beds 28, 28' and 28". The purging fluid is permitted to flow for a period following the shutting off of the heaters. The upwardly flowing hot purging fluid is evenly distributed over the entire lower surface of each of the adsorbent beds by means of the restrictive openings in the fine mesh wire screens 23, 23' and 23" which act in the nature of plenums. This insures a complete heating of all portions of the adsorbent bed as the hot purging fluid continues to convey the heat fronts upwardly through the beds. These screens along with wire screens 29, 29' and an additional screen 30 located in the bottom of the heater 24 also absorb and retain heat during activation of the heating units. This aids in heating the purging fluid which absorbs this heat as it flows through the screens. When the temperature of the adsorbent material reaches the required level, the adsorbate is given up to the stream of purging fluid. The purging fluid and the entrained adsorbate are then exhausted from the enclosed area through duct 41, valve 34, duct 44, valve 35 and duct 45.

The period of activation of the heating units and the rate of flow of the purging fluid can be varied depending upon the construction and materials, such as type of adsorbent material, type of adsorbate, number of heaters employed, etc., appearing in each individual adsorption device. Generally, the heating units are activated prior to or concurrently with initiation of the flow of purging fluid, and the purging fluid is allowed to flow for a period following the shutting off of the heat source to distribute the heat fronts throughout the adsorbent.

After the supply of heat has been stopped and the flow of hot purging fluid has removed substantially all of the adsorbate from the adsorbent material, the direction of flow is reversed by switching valve 35 to the position indicated by the dotted line and cooling fluid, e.g., air, is drawn through duct 46, valve 35, duct 44, valve 34 and duct 41 into the top of the container 10. The cooling fluid then pushes the heat fronts which have collected in the top of the individual adsorbent beds downwardly resulting in the faster cooling of the upper portions of the beds. Again the fluid is evenly distributed throughout the adsorbent beds by the restrictive openings in the fine mesh wire screens 29, 29' and 29". This fluid is then exhausted through duct 48, valve 36, duct 47, valve 35 and duct 45. The flow of the cooling fluid can be reversed by switching valve 35 to its alternate positions as many times as desirable to push the remaining heat fronts alternately toward the lower portions and upper portions of the adsorbent beds. It is only necessary that the final cooling fluid flow downwardly so that substantially all the remaining heat will be lodged in the lower portions of the beds and the upper portions will again be ready to efficiently adsorb the undesirable substances from a fluid mixture.

After the flow of the cooling fluid is stopped the fluid control valves 34 and 36 are switched to the positions indicated by the dotted lines and valve 35 is returned to the position shown by the solid line. The fluid mixture from which it is desired to remove the entrained adsorbate, is then drawn through duct 42, valve 34 and duct 41 into the container 10. As the fluid mixture flows downwardly through the adsorbent bed, there occurs both cooling of the lower portion of each individual bed and adsorption by the upper portion. When the lower portions are cooled sufficiently by the flow of the fluid mixture, they also begin removing the entrained adsorbate and reactivation of the entire adsorbent material is complete. This simultaneous cooling and adsorbing at the initiation of the adsorbing cycle is desirable in decreasing the period of reactivation. The remaining purified fluid mixture is then returned through duct 48, valve 36 and duct 50 to the enclosed area from which it is desired to remove the adsorbate.

The switching of the fluid-control valves to the last-named positions initiates the reactivation of the container 40 the procedure being the same as described in the reactivation of container 10. The operation of the apparatus is so regulated that, concurrently with the exhaustion of the adsorbent material in one tower, the reactivation of the adsorbent material in the other tower is completed, permitting the towers to be once again switched to provide continuous adsorption.

Generally, all the structural parts of the adsorption device can be constructed of any fluid-tight material such as metal, etc. If the device is to be placed in a refrigerated area where it would be desirable to have as little heat as possible escape during the reactivation cycle, the various parts can be insulated in any conventional manner, e.g., by wrapping with insulating material such as Fiberglas, providing dead air space, etc.

Conventional adsorbent materials can be employed to remove a variety of undesirable adsorbates entrained in the fluid mixture being processed. For example, water, carbon dioxide, ethylene, hydrogen, sulfur dioxide and poisonous substances such as carbon monoxide can be eliminated from a fluid mixture containing such adsorbates. The adsorbent material which is employed can be selected from a number of dry, generally finely-divided, natural or synthetic, solid materials well known for their adsorption characteristics. Obviously, the final selection of an appropriate adsorbent material will depend upon a number of factors such as the particular substances adsorbed, e.g., their molecular weight, degree of saturation, polarity, etc., the ease and speed of reactivation of the saturated or spent adsorbent material, thermodynamic equilibrium conditions, e.g., temperature, vapor pressure, etc. Examples of adsorbents which can be used are the group of synthetic zeolites, often referred to as "Molecular Sieves," fully described in the United States Patents 2,882,243, and 2,882,244, activated alumina, silica gel, activated charcoal and dolomite. Although it is generally most convenient to use air as the purging and cooling fluid, nitrogen, natural gas and other inert fluids can also be employed. The purging fluid can be the same or different than the cooling fluid.

The apparatus and process of this invention are useful wherever it is desired to adsorb a fluid component or a plurality of components from a fluid mixture such as in dehumidification or gas purifying by selective adsorption. My device is ideally adapted to be used for carrying out the process of adsorbing harmful impurities from the atmosphere surrounding fresh produce stored in an enclosed area, fully described in a copending application of William T. Harvey, Jr., Serial Number 294,170 entitled Adsorbing Process filed concurrently herewith, the disclosure of which is hereby incorporated by reference.

Although this invention has been described with reference to an illustrative embodiment thereof, it will be apparent to those skilled in the art that the principles of this invention can be embodied in other forms but within the scope of the claims.

I claim:

1. An adsorption device for selectively removing fluid adsorbate from a fluid mixture comprising,
   (a) a closed container having a first and a second port at opposite ends thereof, said container having located therein,
      (i) a plurality of sections of adsorptive material which retains said adsorbate until said material is reactivated, and
      (ii) a plurality of heating units spaced apart along the flow path of a reactivating fluid flowing through said container, the number of said heating units being equal to the number of said sections of adsorptive material, one of said heating units being mounted between each of said sections and one of said heating units being mounted upstream of the first of said sections with respect to the direction of flow of said reactivating fluid,
   (b) means to selectively effect ingress of said fluid mixture into said container through said first port and egress of said fluid mixture through said second port,
   (c) means to selectively effect ingress of said reactivating fluid into said container through one of said ports and egress through the other of said ports,
   (d) means to selectively effect ingress of a cooling fluid into said container through one of said ports and egress through the other of said ports, and
   (e) means to selectively energize each of said heating units for reactivation of said adsorptive material, the location of said sections and said heating units within said container being such that said reactivating fluid and said cooling fluid directly pass serially from one end of said container to the other end alternately through said heating units and said sections.

2. An adsorption device as defined in claim 1 wherein said sections of adsorptive material are spaced apart and wherein said heating units are physically isolated from said adsorptive material.

3. An adsorption device as defined in claim 1 wherein said heating units provide a plurality of heat fronts of varying intensity, said intensity decreasing in the direction of flow of said reactivating fluid through said container.

4. An adsorption device as defined in claim 1 wherein said reactivating fluid enters said container through said second port and leaves through said first port and wherein said cooling fluid enters said container through said first port and leaves through said second port.

5. A process for reactivating an adsorption device having a plurality of sections of adsorptive material containing adsorbate and heating units, said sections and said heating units being alternately mounted within the adsorption device in such a manner that a fluid mixture flowing through said adsorptive device passes alternately through a heating unit and a section of adsorptive material, comprising the steps of introducing a plurality of heat fronts in said sections by activating said heating units, flowing a first fluid mixture through said sections and said heating units to convey said heat fronts throughout said sections to heat said adsorptive material to a level such that said adsorbate is released from said adsorptive material and is removed by said first fluid mixture and thereafter flowing a second fluid mixture through said sections and heating units in a direction opposite to the flow of said first fluid mixture to cool said adsorptive material.

6. The process of claim 5 in which the heating units are deactivated prior to the termination of the flow of said first fluid mixture.

7. The process of claim 6 in which the first fluid mixture first flows through a heating unit.

8. The process of claim 7 in which the second fluid mixture first flows through a section of adsorptive material.

9. The process of claim 7 in which the heat front introduced into the adsorptive material by activation of the heating unit first contacted by said first fluid mixture is greater than any other heat front introduced by activation of another heating unit.

10. The process of claim 5 in which said first and second fluid mixtures are the same.

11. The process of claim 10 in which said first and second fluid mixtures are air.

12. The process of claim 5 comprising the additional step of reversing the direction of flow of said second fluid mixture a plurality of times, the last direction of flow being opposite to the direction of flow of the first fluid mixture.

13. The process of claim 5 in which the adsorptive material is a synthetic zeolite.

References Cited by the Examiner
UNITED STATES PATENTS

| | | | |
|---|---|---|---|
| 1,294,463 | 2/1919 | Hills | 210—185 |
| 1,799,858 | 4/1931 | Miller | 208—310 |
| 1,849,648 | 3/1932 | Urbain | 208—310 |
| 2,103,434 | 12/1937 | Pennebaker | 210—185 |
| 2,113,010 | 4/1938 | Tears | 252—414 |
| 2,173,844 | 9/1939 | Houdry | 23—288 |
| 2,906,604 | 9/1959 | Kaess et al. | 23—288 |
| 2,940,926 | 6/1960 | Henke et al. | 208—310 |

FOREIGN PATENTS 507,336 11/1954 Canada.

References Cited by the Applicant
FOREIGN PATENTS 366,885 2/1932 Great Britain.

BENJAMIN HENKIN, *Primary Examiner.*

MAURICE A. BRINDISI, *Examiner.*

R. M. DAVIDSON, H. S. MILLER, *Assistant Examiners.*